(12) United States Patent
Ruan et al.

(10) Patent No.: US 10,165,092 B2
(45) Date of Patent: Dec. 25, 2018

(54) USING A NETWORK SERVICE HEADER TO MANAGE A NETWORK-AS-A-SYSTEM

(71) Applicant: CISCO TECHNOLOGY, INC., San Jose, CA (US)

(72) Inventors: Yixing Ruan, San Jose, CA (US); James N. Guichard, New Boston, NH (US); Javed Asghar, Dublin, CA (US); Carlos M. Pignataro, Raleigh, NC (US); Kenneth Eugene Gray, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 54 days.

(21) Appl. No.: 15/152,213

(22) Filed: May 11, 2016

(65) Prior Publication Data

US 2017/0331737 A1    Nov. 16, 2017

(51) Int. Cl.
| | |
|---|---|
| H04L 12/701 | (2013.01) |
| H04L 12/801 | (2013.01) |
| H04L 29/06 | (2006.01) |
| H04L 12/46 | (2006.01) |
| H04L 12/725 | (2013.01) |
| H04L 12/721 | (2013.01) |
| H04L 12/713 | (2013.01) |

(52) U.S. Cl.
CPC .......... *H04L 69/22* (2013.01); *H04L 12/4633* (2013.01); *H04L 45/306* (2013.01); *H04L 45/566* (2013.01); *H04L 45/586* (2013.01)

(58) Field of Classification Search
CPC ................. H04L 47/18; H04L 47/2441; H04L 61/2592; H04L 69/22; H04L 2212/00
See application file for complete search history.

(56) References Cited

U.S. PATENT DOCUMENTS

| | | | |
|---|---|---|---|
| 2015/0103827 A1* | 4/2015 | Quinn .................... | H04L 45/74 370/392 |
| 2015/0222640 A1* | 8/2015 | Kumar .................. | H04L 47/782 370/230 |
| 2015/0326473 A1* | 11/2015 | Dunbar ............... | H04L 12/4633 370/392 |
| 2015/0365331 A1* | 12/2015 | Huang ................... | H04L 45/74 370/392 |
| 2016/0028640 A1* | 1/2016 | Zhang ................... | H04L 45/306 370/389 |
| 2016/0119226 A1* | 4/2016 | Guichard ............... | H04L 45/00 370/392 |
| 2016/0352629 A1* | 12/2016 | Wang ..................... | H04L 45/38 |
| 2017/0163569 A1* | 6/2017 | Koganti ................. | H04L 49/25 |
| 2017/0237656 A1* | 8/2017 | Gage ...................... | H04L 45/74 370/392 |

* cited by examiner

*Primary Examiner* — Scott M Sciacca (57) ABSTRACT

Aspects of the embodiments are directed to augmenting a control packet with an interface identifier, the interface identifier identifying an interface at a physical network forwarding element; and transmitting the control packet with the interface identifier to the physical network forwarding element. The interface identifier can be included in metadata of a network service header (NSH). The NSH is encapsulated with the control packet, which is transmitted with the control packet. The NSH can be extracted and the interface identifier used to identify a user interface (or a presenting interface) based on a metadata lookup.

20 Claims, 10 Drawing Sheets

USING A NETWORK SERVICE HEADER TO MANAGE A NETWORK-AS-A-SYSTEM

FIELD

This disclosure is directed to using a network service header (NSH) to manage a network as a system.

BACKGROUND

As the scale of a service provider network grows, the complexity of network management/maintenance and service provisioning increases exponentially. Software defined networking (SDN) allows network administrators to manage network services through abstraction of higher-level functionality. This is done by decoupling the system that makes decisions about where traffic is sent (the control plane) from the underlying systems that forward traffic to the selected destination (the data plane).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DETAILED DESCRIPTION

This disclosure describes using network service header (NSH) path identifier and metadata to aid in mapping interface translation between a control plane element's (e.g., a virtual router such as XRv) presenting interface and the underlay forwarding elements user interface.

This mapping using NSH path ID and metadata can be extended to any route-server or central protocol session management environment. These mechanisms enable transparency for diverted protocol flows and a new method of implementing a route server or consolidated logical peering point for the managed element collection described in the introduction (providing a unified routing view to the members and their external peers).

NSH can be used as an inter-process communication mechanism to transport control packets between forwarding elements and control plane elements (XRv). The NSH information can includes support for the following actions in the metadata lookup result:

Redirect packets to a given next-hop and/or a given VRF.
Reinject packets to a given interface.
Send out packets to a given interface.
Send out L2 frames via a given bridge domain.

Aspects of the embodiments are directed to a method performed at a control plane element, the method including augmenting a control packet with an interface identifier, the interface identifier identifying an interface at a physical network forwarding element; and transmitting the control packet with the interface identifier to the physical network forwarding element.

Aspects of the embodiments are directed to a method performed at a forwarding element, the method including receiving a control packet, the control packet comprising a network service header; identifying an interface identifier from metadata in the network service header; identifying a user interface of the forwarding element from the interface identifier; and transmitting the control packet from the user interface.

Aspects of the embodiments are directed to a method performed at a forwarding element, the method including receiving a control packet at the forwarding element; performing a policy based routing (PBR) lookup to determine that the control packet is to be transmitted to the control plane; encapsulating the control packet with a network service header, the network service header comprising metadata that comprises an interface identifier; and transmitting the control packet with the network service header to the control plane.

Aspects of the embodiments are directed to a method performed at a control plane element, the method including receiving a control packet from a forwarding element of a physical network underlay; identifying an interface identifier from metadata in the control packet; providing the control packet to a control plane presenting interface; and initializing protocol handling of control packets at the control plane element.

Aspects of the embodiments are directed to a computer-readable non-transitory medium comprising one or more instructions for forwarding a control packet from a control plane to a forwarding element, that when executed on a processor configure the processor to augment a control packet with an interface identifier, the interface identifier identifying an interface at a physical network forwarding element; and transmit the control packet with the interface identifier to the physical network forwarding element.

Aspects of the embodiments are directed to a computer-readable non-transitory medium comprising one or more instructions for handling a control packet at a control plane element, that when executed on a processor configure the processor to receive a control packet from a forwarding element of a physical network underlay; identify an interface identifier from metadata in the control packet; provide the control packet to a control plane presenting interface; and initialize protocol handling of control packets at the control plane element.

Aspects of the embodiments are directed to a computer-readable non-transitory medium comprising one or more instructions for handling a control packet at a forwarding element, that when executed on a processor configure the processor to receive a control packet, the control packet comprising a network service header; identify an interface identifier from metadata in the network service header; identify a user interface of the forwarding element from the interface identifier; and transmit the control packet from the user interface.

In some embodiments, augmenting the control packet comprises adding a network service header (NSH), wherein the NSH comprises metadata that includes the interface identifier.

In some embodiments, transmitting the control packet comprises transmitting the control packet through a presenting interface at the control plane element.

In some embodiments, the control plane element is part of a virtual router.

In some embodiments, identifying an interface identifier from metadata in the control packet comprises identifying an interface identifier from a network service header metadata.

In some embodiments, the interface identifier maps a user interface at a forwarding element to a presenting interface at the control plane element.

In some embodiments, identifying an interface identifier includes triggering metadata extraction from a service path identifier or a service index in metadata in a network service header of the control packet; identifying the interface identifier from a metadata table; and correlating the interface identifier to a presenting interface at the control plane element.

In some embodiments, identifying an interface identifier includes looking up a service path identifier or service index from metadata in the network service header; triggering a metadata table lookup based on the service path identifier or the service index; and identifying the interface identifier from the metadata table lookup.

This disclosure describes a differentiated deployment model to help scale the network infrastructure through the use of a virtualized control plane, on top of a standard interface, to manage a broad set of network elements.

This disclosure describes using Network Service Headers (NSH) to address these limitations by leveraging the path identification and metadata capabilities of the protocol, and in particular creating a parallel fabric through the use of the NSH header to address a plurality of forwarding elements controlled through Opendaylight (ODL).

Figure 1A:
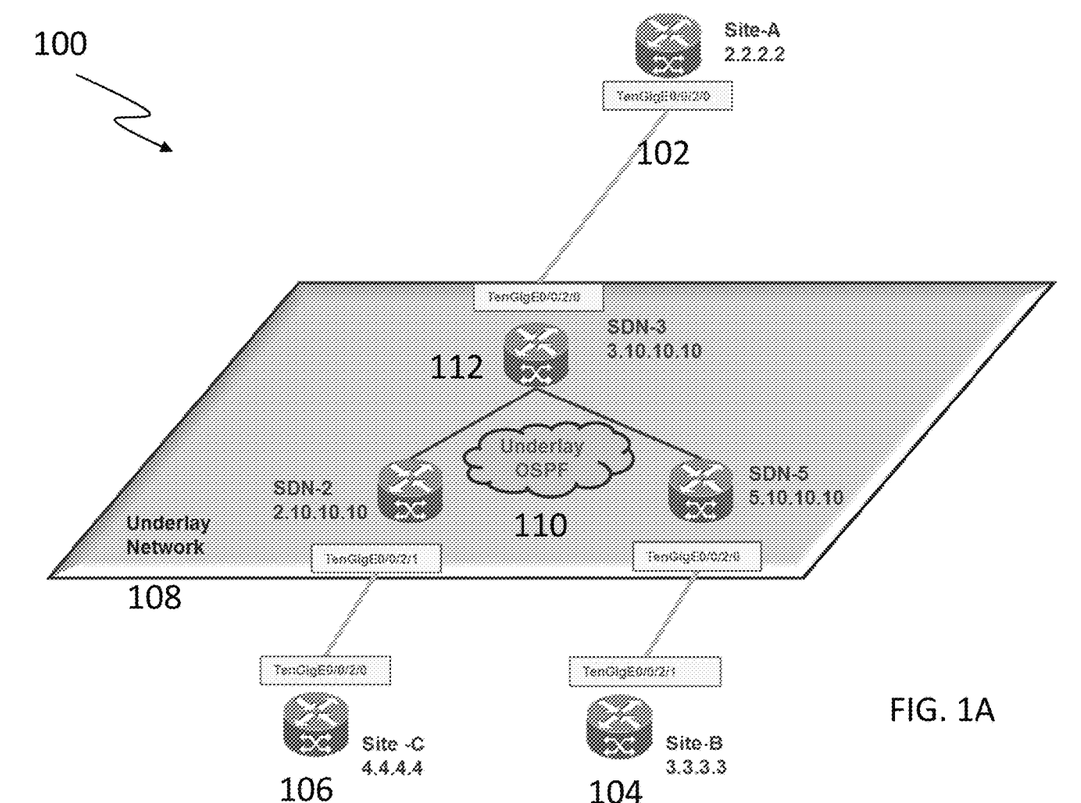
FIG. 1A is a schematic block diagram of an underlay network in accordance with embodiments of the present disclosure.

FIG. 1A is a schematic block diagram 100 of an underlay network 108 in accordance with embodiments of the present disclosure. The underlay network 108 can be a physical network and can facilitate communication pathways and packet forwarding between various sites, such as Site A 102, Site B 104, and Site C 106. The underlay network 108 can include a plurality of forwarding elements 112 that are part of a physical underlaying network fabric 110. As an example, the underlaying network fabric 110 can use open shortest path first (OSPF) protocols for routing packets between sites.

Figure 1B:
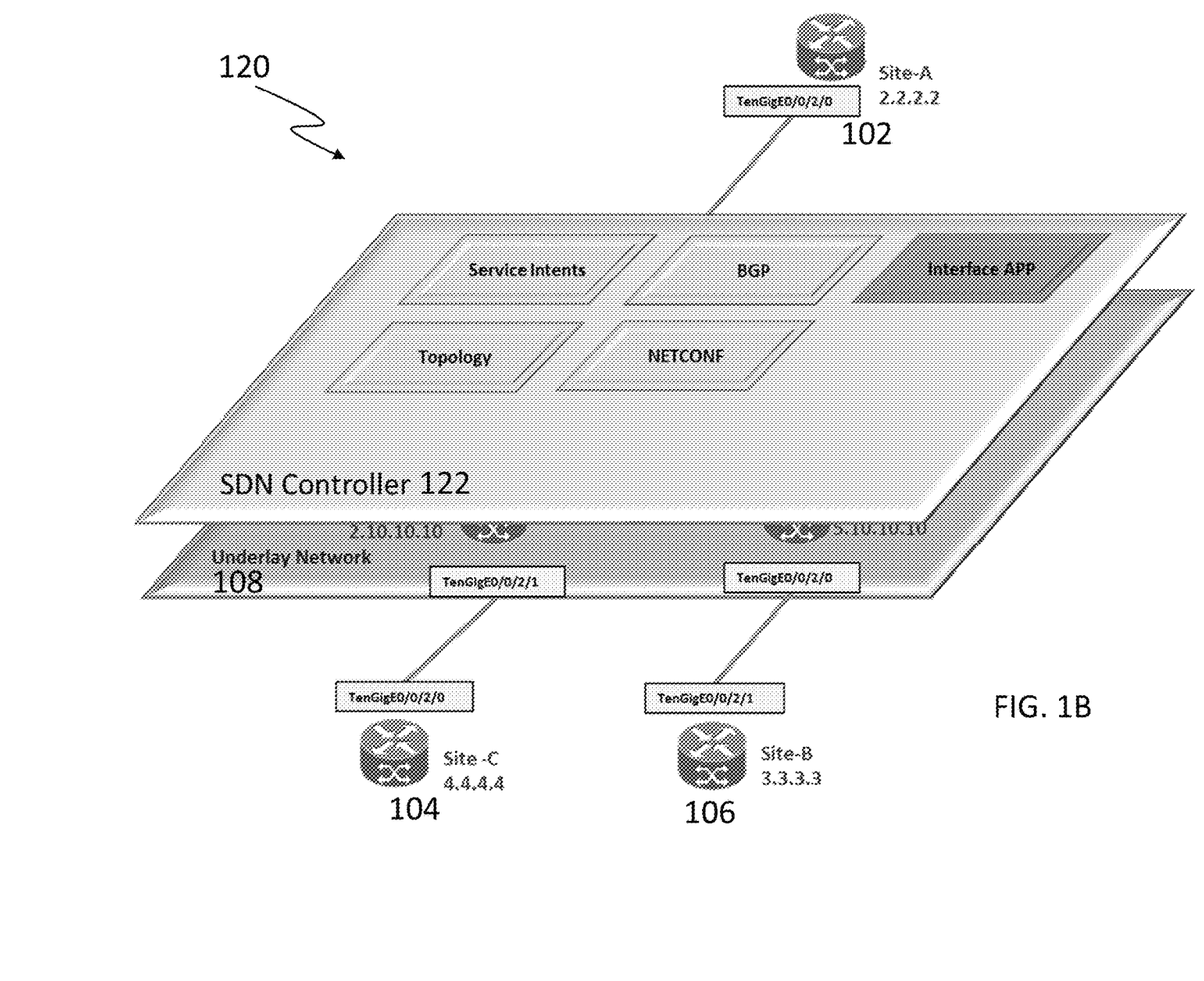
FIG. 1B is a schematic block diagram of a software defined networking controller for the underlay network of FIG. 1A in accordance with embodiments of the present disclosure.

FIG. 1B is a schematic block diagram 120 of a software defined networking controller 122 for the underlay network of FIG. 1A in accordance with embodiments of the present disclosure. The SDN controller 122 can be any type of SDN controller, such as that provided by opendaylight (ODL).

Figure 1C:
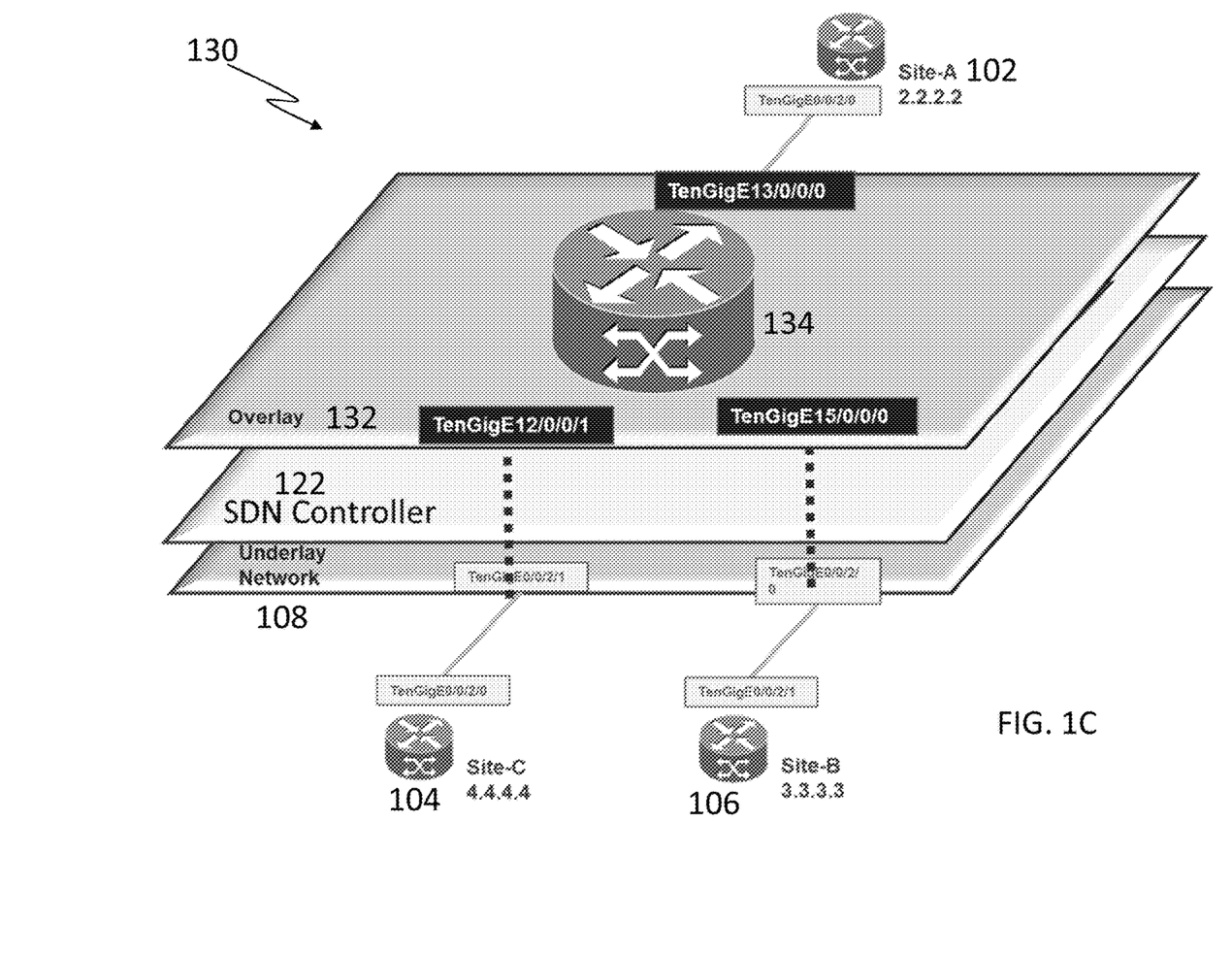
FIG. 1C is a schematic block diagram of a virtual router for the underlay network of FIG. 1A in accordance with embodiments of the present disclosure.

FIG. 1C is a schematic block diagram 130 of a virtual router 134 for the underlay network of FIG. 1A in accordance with embodiments of the present disclosure. The virtual router 134 can be provided by an overlay virtualization topology 132.

Figure 2:
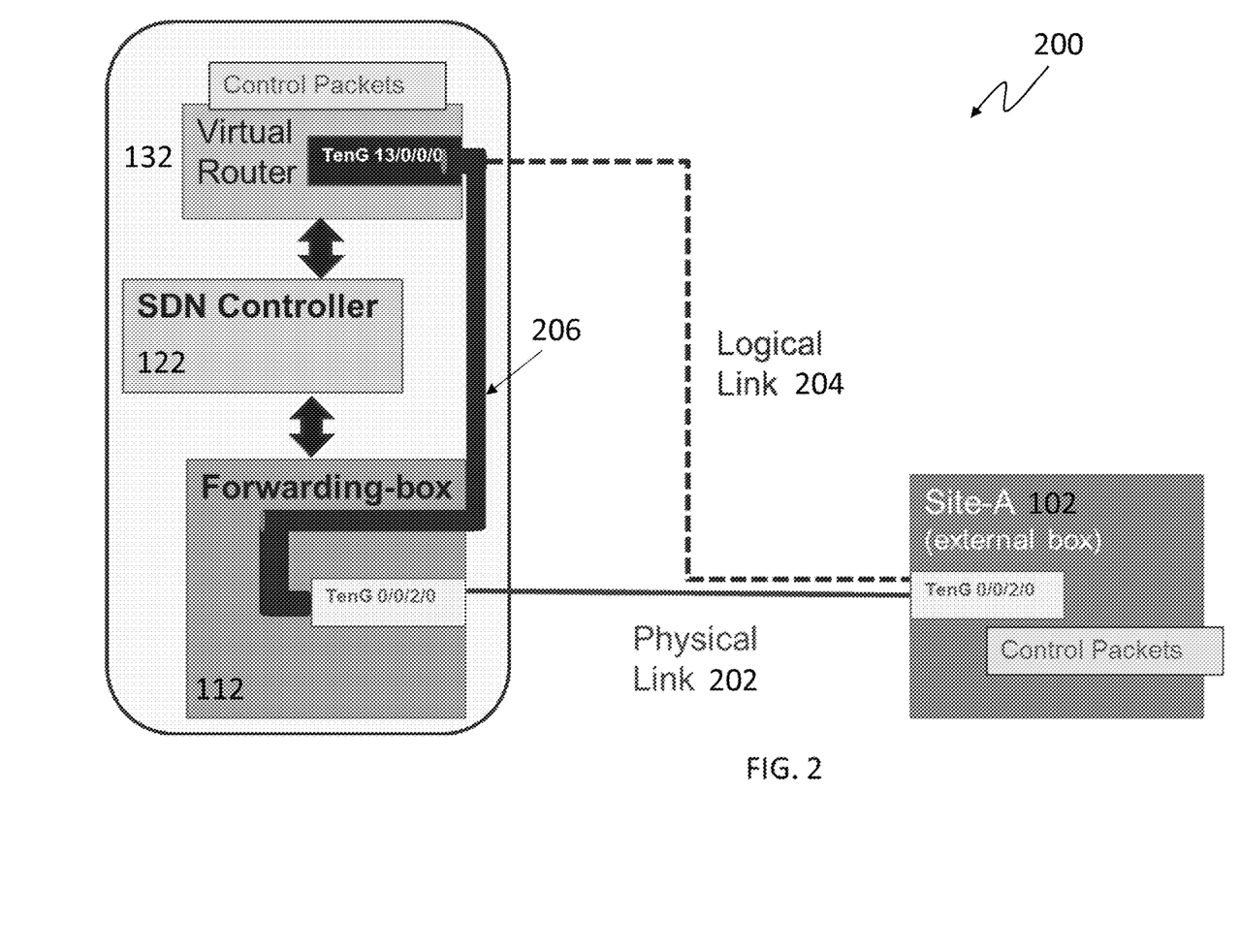
FIG. 2 is a schematic block diagram of a system showing the underlaying network forwarding elements, the SDN controller, and the virtual router overlay in accordance with embodiments of the present disclosure.

FIG. 2 is a schematic block diagram of a system 200 showing the underlaying network forwarding elements 112, the SDN controller 122, and the virtual router overlay 132 in accordance with embodiments of the present disclosure. The system 200 is similar to that shown in FIG. 1C but shown as a vertical "cross section" of the system elements from FIG. 1C.

The physical networking components, shown as a forwarding element 112 can establish a physical link 202 to one or more remote sites, such as Site A 102. The physical link can be a direct connection or through an indirect connection, such as through a TCP/IP connection.

The virtual router 132 can establish a logical link 204 between the virtual router 132 and the Site A 102. The Site A 102 would be able to use the physical links provided by the forwarding elements 112, but the virtual router 132 would be used as a control plane element. The virtual router 132 could include XRv, which can be used as a control plane element sitting on top of an SDN controller, such as (ODL). It is understood, however, that any virtual router could be used as long as the virtual router supports the open APIs.

To support routing protocols in using a virtual router, an overlay tunnel 206 can be established between the virtual router 132 and forwarding element 112, so control packets can flow between forwarding element user interfaces and XRv's corresponding "presenting" interfaces, described below with the text accompanying FIG. 3.

Figure 3:
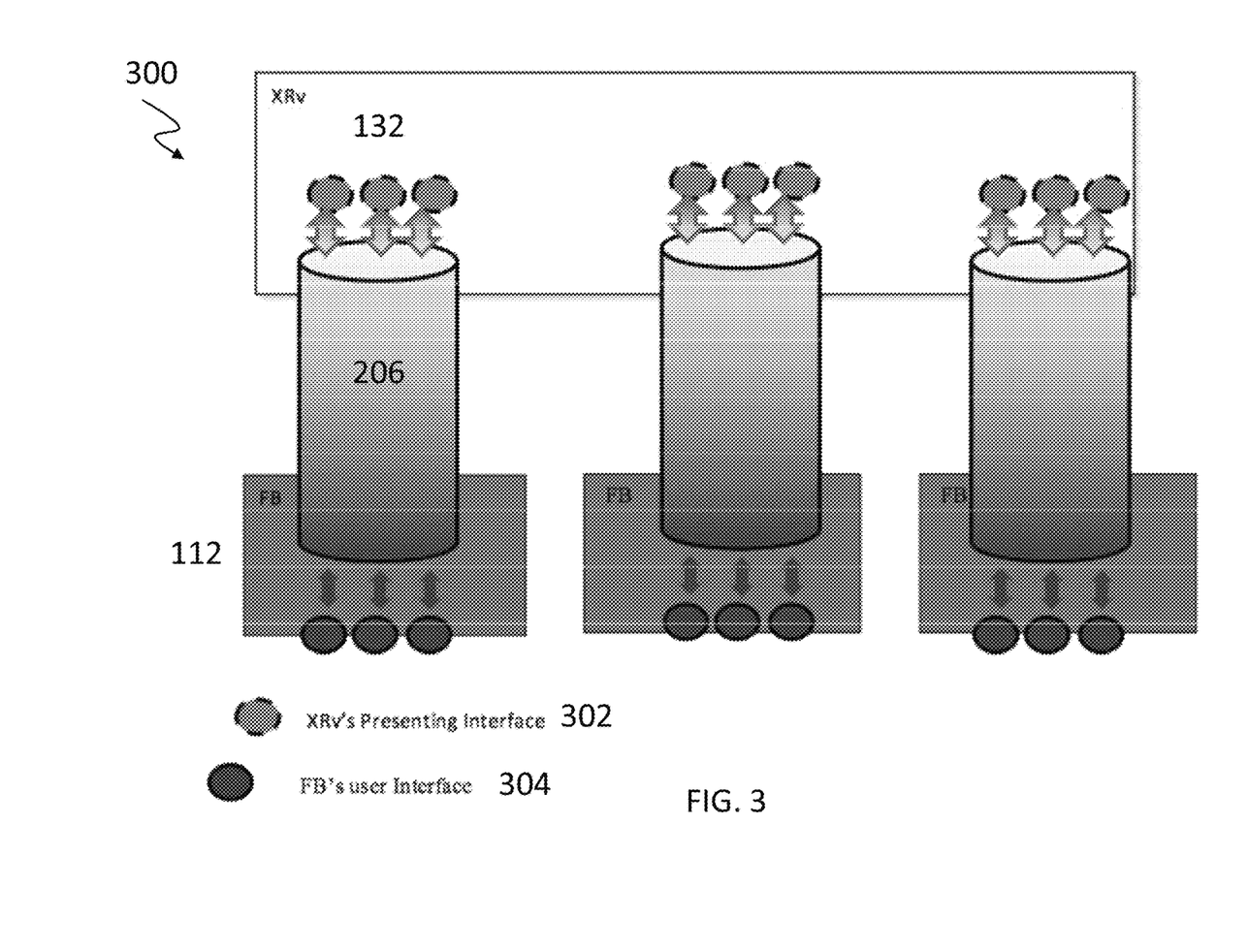
FIG. 3 is a schematic diagram of a virtual routing system showing virtual router interfaces and forwarding block interfaces in accordance with embodiments of the present disclosure.

FIG. 3 is a schematic diagram of a virtual routing system 300 showing virtual router interfaces 302 and forwarding block interfaces 304 in accordance with embodiments of the present disclosure. When a network is managed as a system, the underlying packet forwarding elements 112 contain a set of user interfaces 304 that are used to connect with external forwarding elements and other network elements (such as service appliances). These user interfaces 304 are presented to an external control plane element 132.

The user interfaces 304 that are available at the forwarding elements are viewed as "presenting" interfaces 302 at the control plane level. The "presenting" interface 302 names are constructed based on associated forwarding element and user interface 304 information using predefined naming conventions.

The following parameters can be set to support the virtualization:

1. Control packets (and some special ICMP packets) sent by the control plane to a presenting interface 302 are to be sent out via the corresponding user interface 304 at the appropriate forwarding element.

2. Control packets (and some special ICMP packets) received by a forwarding element user interface 304 are to be received by a presenting interface 302 to leverage existing routing code in the virtual router.

3. Data packets received by a forwarding element user interface 304 should be handled in the forwarding elements data plane and not be sent to the virtual router control element.

As part of creating the presenting interface 302, the control plane element (XRv in one example implementation) assigns a unique interface-id to the interface. This unique interface-id is used to set up the following two mapping tables:

A mapping table to map the interface-id to XRv's presenting interface.

A mapping table to map the interface-id to the forwarding elements user interface.

The mapping tables can facilitate a one-to-one correspondence between presenting interfaces at the virtual router and user interfaces at the forwarding elements (also referred to as forwarding blocks).

Figure 4:
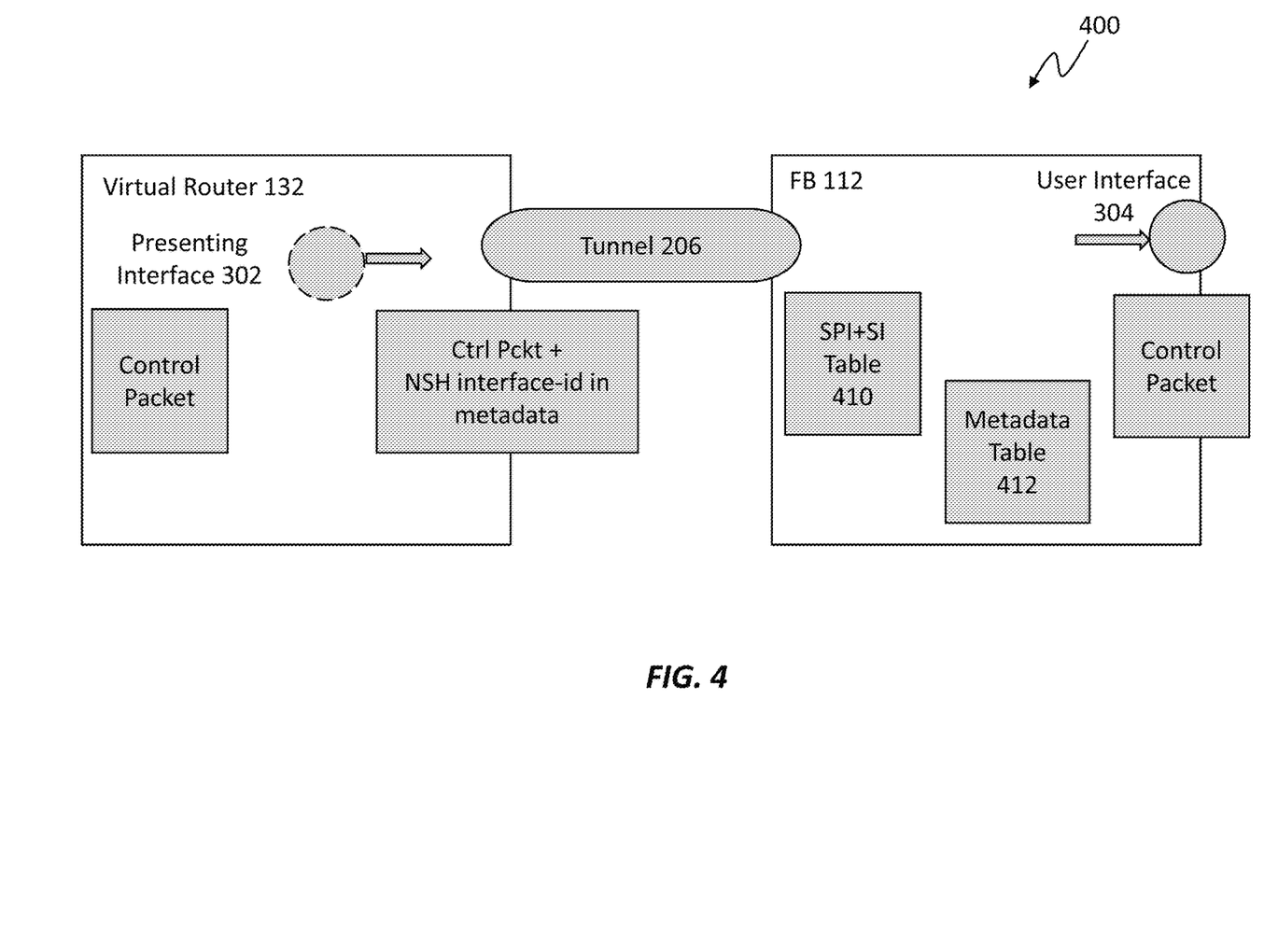
FIG. 4 is a schematic block diagram of a virtual router handling a control packet communication to a forwarding element in accordance with embodiments of the present disclosure.

Control Packet Flow—Control Plane Element (Virtual Router) to Forwarding Element:

FIG. 4 is a schematic block diagram 400 of a virtual router handling a control packet communication to a forwarding element in accordance with embodiments of the present disclosure.

The virtual router 132 can include a presenting interface 302, as described above. A control packet can be sent via the presenting interface 302 through a tunnel 206 to the forwarding element 112 that is part of the network underlay. The control packet can undergo encapsulation that results in the addition of an NSH metadata that includes an interface-id. Interface-id identifies a user interface 304 at the forwarding element that corresponds to the presenting interface 302.

The forwarding element 112 can maintain or access Service Path Identifier (SPI) and Service Index (SI) information 410 which indicates incoming NSH packets that need additional lookup in metadata table 412. The forwarding element 112 also maintains a metadata table 412 that allows the forwarding element to parse metadata information from NSH metadata in the control packet. Once the NSH information is extracted from control packet, user interface 304 can be identified. The control packet can be transmitted from user interface 304.

Figure 5:
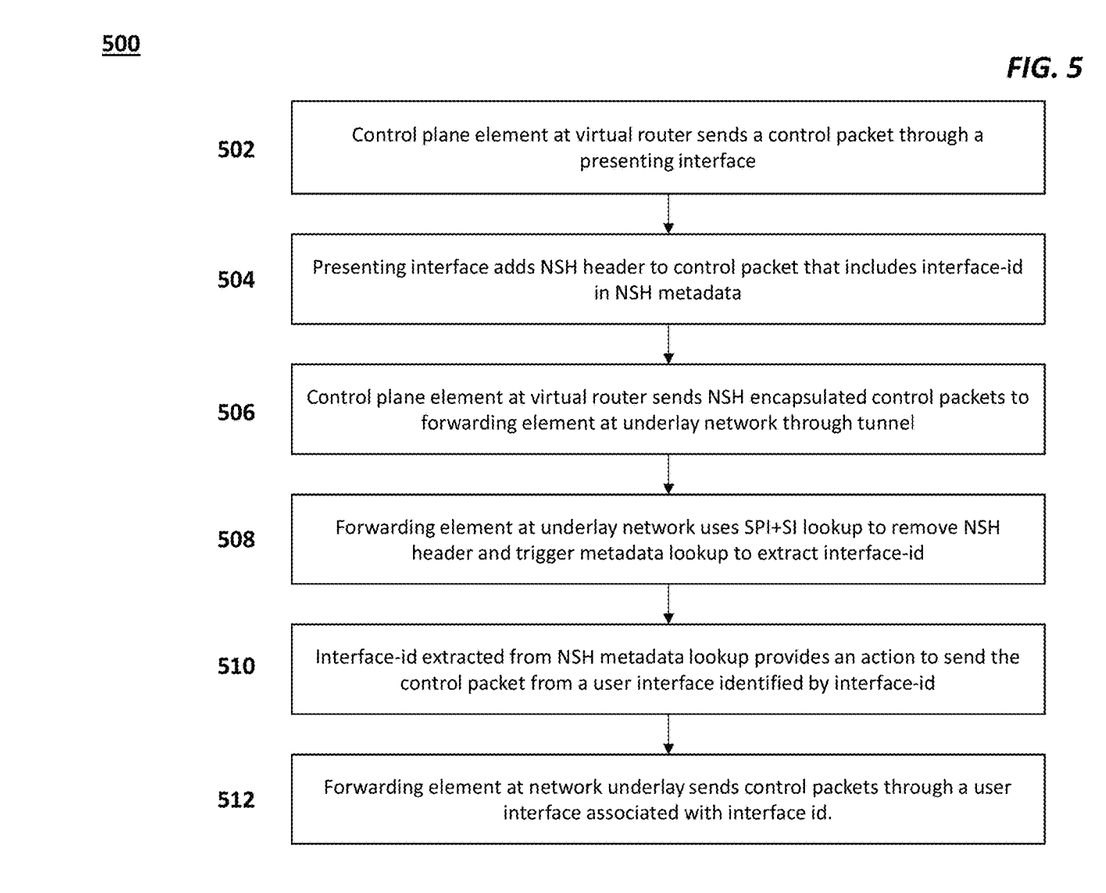
FIG. 5 is a process flow diagram for a virtual router handling a control packet communication to a forwarding element in accordance with embodiments of the present disclosure.

FIG. 5 is a process flow diagram 500 for a virtual router handling a control packet communication to a forwarding element in accordance with embodiments of the present disclosure. Control packets are sent between the control plane element and the forwarding elements as follows:

The control plane element (XRv) sends out control packets through a presenting interface (502). As part of the presenting interface's encapsulation handling, an NSH header is added with an interface-id stored in the NSH metadata (504). The control plane element (XRv) sends NSH encapsulated packets to the corresponding forwarding element (506).

Upon receiving NSH encapsulated packets at the forwarding element, an NSH SPI+SI lookup indicates that the forwarding element needs to remove the NSH header and trigger metadata lookup to extract the stored interface-id (508). The interface-id extracted from the NSH metadata lookup provides an action to send the packet out of a corresponding forwarding element user interface (510). In some embodiments, for routed packets, the action could result in a redirect to a corresponding next-hop and VRF forwarding element user interface ARP tables are not maintained in the control plane element (XRv).

The forwarding element sends the control packets out of the user interface associated with the extracted interface-id (512).

Figure 6:
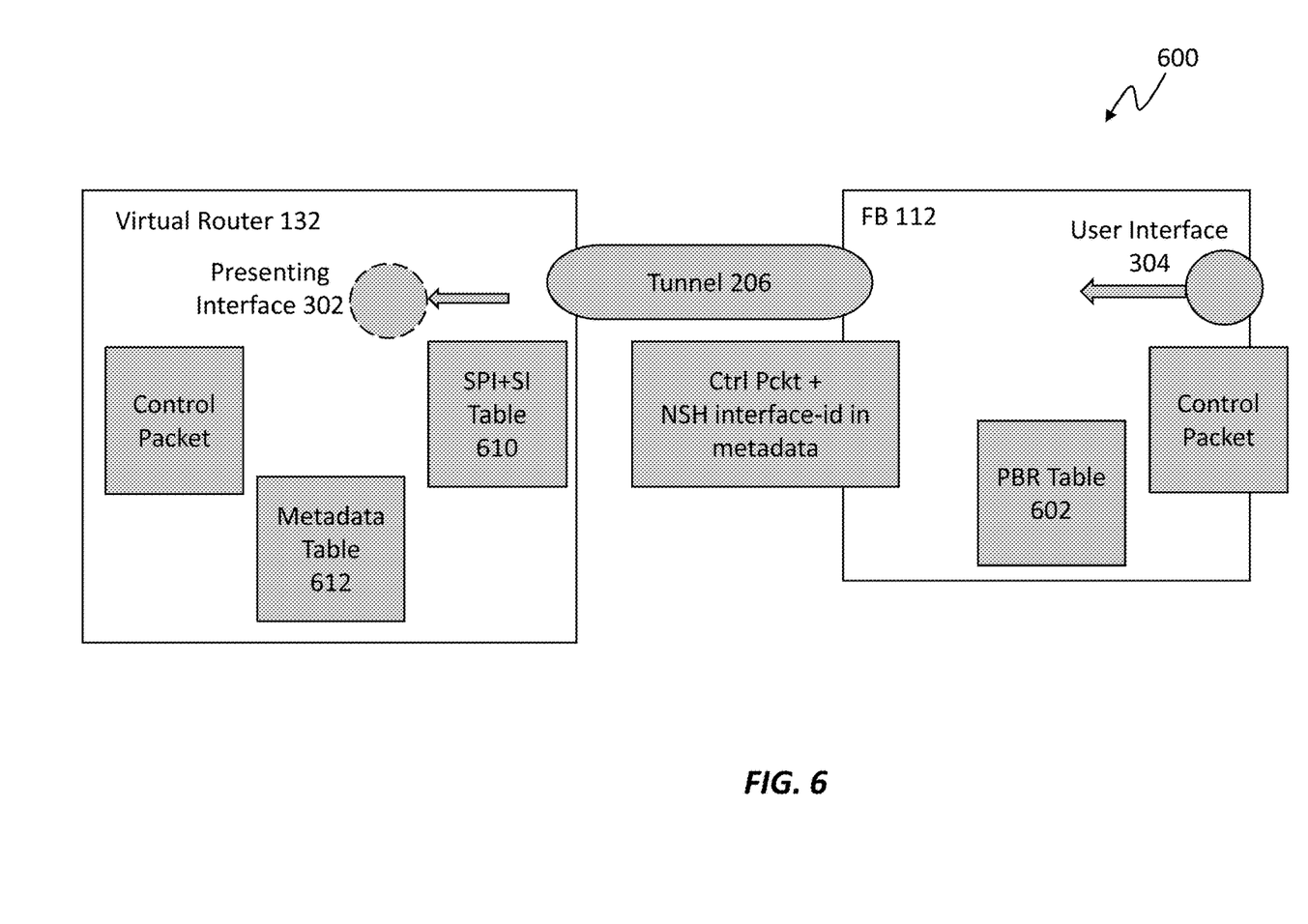
FIG. 6 a schematic block diagram of a forwarding element user interface handling of a control packet communication to a virtual router presenting interface in accordance with embodiments of the present disclosure.
Figure 7:
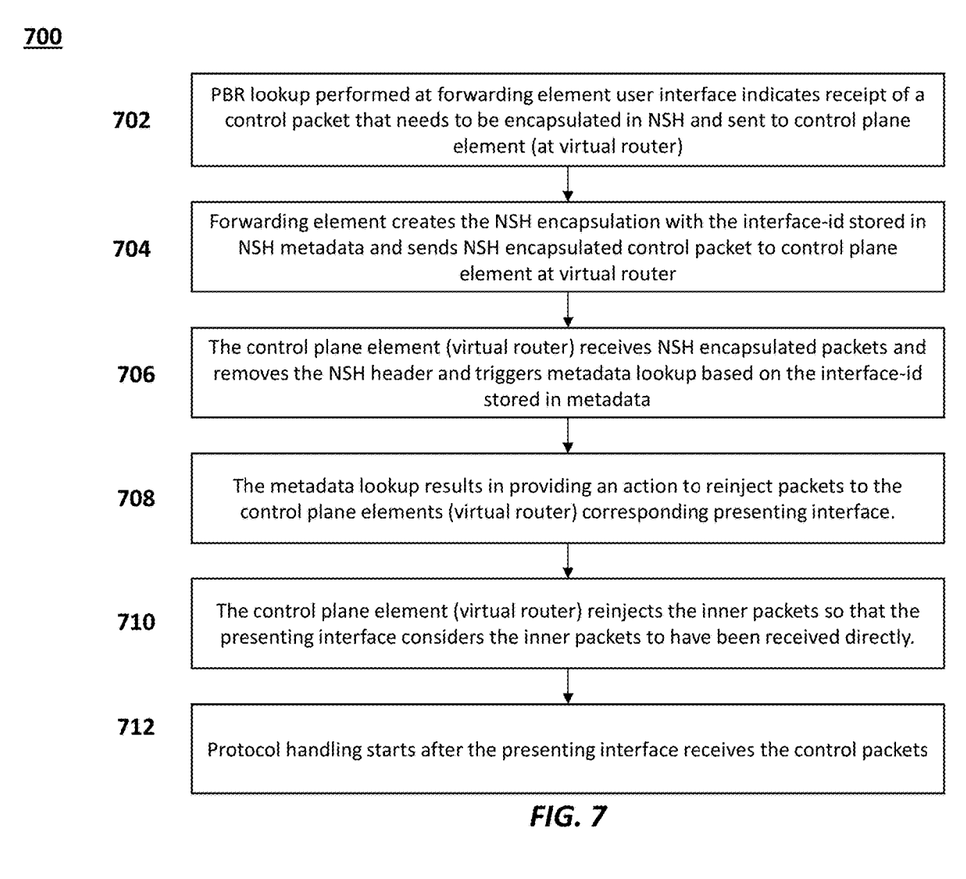
FIG. 7 is a process flow diagram for a forwarding element handling a control packet communication to a virtual router in accordance with embodiments of the present disclosure.

Control Packet Flow—Forwarding Element to Control Plane Element (XRv):

FIG. 6 a schematic block diagram 600 of a forwarding element user interface 304 handling of a control packet communication to a virtual router presenting interface 302 in accordance with embodiments of the present disclosure. FIG. 7 is a process flow diagram 700 for a forwarding element handling a control packet communication to a virtual router in accordance with embodiments of the present disclosure. Control packets are sent between the forwarding elements and the control plane element as follows:

A Policy Based Routing (PBR) table 602 can be maintained at the forwarding element 112 (or accessed by the forwarding element 112). PBR lookup performed at the forwarding element user interface 304 can indicate the receipt of control packets that need to be encapsulated in NSH and be sent to the control plane element (virtual router) (702). The forwarding element 112 creates the NSH encapsulation with the interface-id stored in metadata and sends the NSH encapsulated packets to the control plane element at virtual router 132 (704).

The control plane element 132 receives NSH encapsulated control packets and removes the NSH header and triggers metadata lookup based on the interface-id stored in metadata (706). For example, the virtual router 132 can access or maintain a SPI/SI table 610 for service path or service index lookup. The virtual router 132 can also maintain or access a metadata table 612. The metadata lookup results in providing an action to reinject packets to the control plane element's corresponding presenting interface 302 (708). The control plane element (virtual router) reinjects the inner packets so that the presenting interface considers that the presenting interface received the inner packets directly (710). Protocol handling starts after the presenting interface receives the control packets (712).

Network Service Header (NSH) Encapsulation

Generally speaking, an NSH includes service path information, and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier (SCL) or some other suitable SFC-aware network element can process packets or frames of a traffic flow and performs NSH encapsulation according to a desired policy for the traffic flow.

Figure 8:
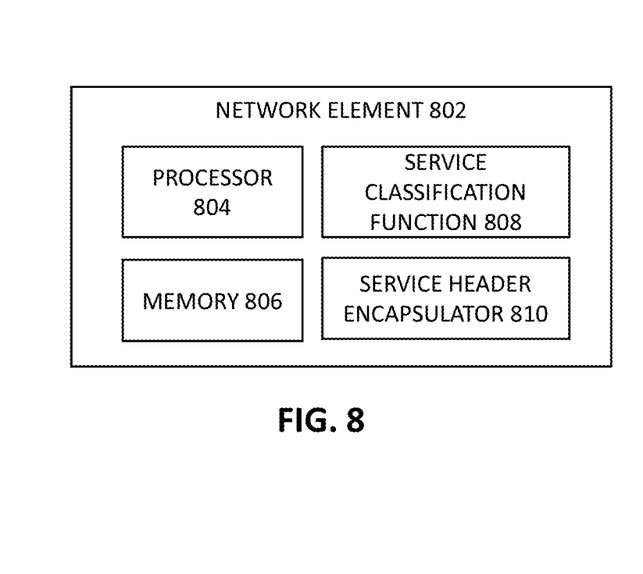
FIG. 8 shows a system view of SFC-aware network element, e.g., such as a (initial) service classifier (SCL), for prescribing a service path of a traffic flow, according to some embodiments of the disclosure.

FIG. 8 shows a system view of SFC-aware network element, e.g., such as a (initial) service classifier (SCL), for prescribing a service path of a traffic flow, according to some embodiments of the disclosure. Network element 802 includes processor 804, (computer-readable non-transitory) memory 806 for storing data and instructions. Furthermore, network element 802 includes service classification function 808 and service header encapsulator 810 (both can be provided by processor 804 when processor 804 executes the instructions stored in memory 806).

The service classification function 808 can process a packet of a traffic flow and determine whether the packet requires servicing and correspondingly which service path to follow to apply the appropriate service. The determination can be performed based on business policies and/or rules stored in memory 806. Once the determination of the service path is made, service header encapsulator 810 generates an appropriate NSH having identification information for the service path and adds the NSH to the packet. The service header encapsulator 810 provides an outer encapsulation to forward the packet to the start of the service path. Other SFC-aware network elements are thus able to process the NSH while other non-SFC-aware network elements would simply forward the encapsulated packets as is. Besides inserting an NSH, network element 802 can also remove the NSH if the service classification function 808 determines the packet does not require servicing.

Network Service Headers

A network service header (NSH) can include a (e.g., 64-bit) base header, and one or more context headers. Generally speaking, the base header provides information about the service header and service path identification (e.g., a service path identifier), and context headers can carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location within a path. The (variable length) context headers can carry opaque metadata and variable length encoded information. The one or more optional context headers make up a context header section in the NSH. For instance, the context header section can include one or more context header fields having pieces of information therein, describing the packet/frame. Based on the information in the base header, a service function of a service node can derive policy selection from the NSH. Context headers shared in the NSH can provide a range of service-relevant information such as traffic classification. Service functions can use NSH to select local service policy.

Service Nodes and Proxy Nodes

Figure 9:
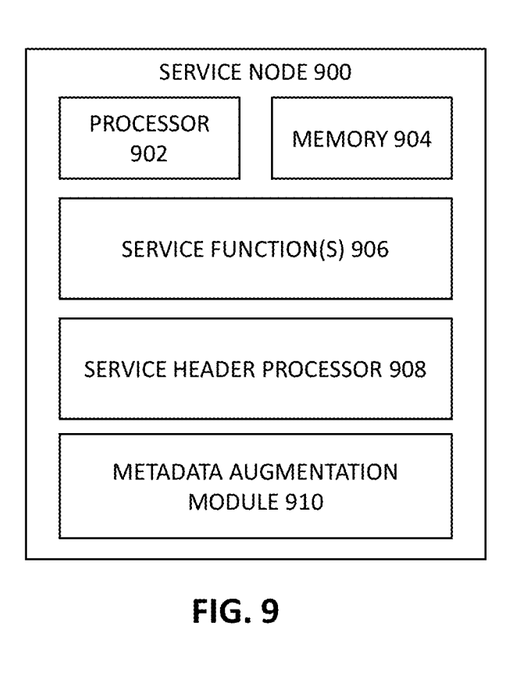
FIG. 9 shows a system view of a service node, according to some embodiments of the disclosure.

Once properly encapsulated, the packet having the NSF is then forwarded to one or more service nodes where service(s) can be applied to the packet/frame. FIG. 9 shows a system view of a service node, according to some embodiments of the disclosure. Service node 900, generally a network element, can include processor 902, (computer-readable non-transitory) memory 904 for storing data and instructions. Furthermore, service node 900 includes service function(s) 906 (e.g., for applying service(s) to the packet/frame, classifying the packet/frame) and service header processor 908. The service functions(s) 906 and service header processor 908 can be provided by processor 902 when processor 902 executes the instructions stored in memory 904. Service header processor 908 can extract the NSH, and in some cases, update the NSH as needed. For instance, the service header processor 908 can decrement the service index if a service index=0 is used to indicate that a packet is to be dropped by the service node 900. In another instance, the service header processor 908 or some other suitable module provide by the service node can update context header fields if new/updated context is available.

Metadata Augmentation

Besides general servicing of the NSH, a service node can provide additional functionality by augmenting the metadata, e.g., by adding precision to the metadata. The present disclosure describes some exemplary methods for augmenting metadata of a NSH.

Generally speaking, metadata in the NSH reflects some form of classification. At the initial classifier, a packet or frame can be classified, where a first metadata in the NSH would reflect the classification. For example, the initial classifier can classify that the packet/frame of a traffic flow is associated with e.g., an "employee" or "guest". When a first service node in the service path processes the first metadata in the NSH, the first service node can apply a first policy accordingly based on the first metadata.

With augmentation, the first service node can also further classify the packet or frame as being associated with, e.g., application X, and accordingly generate a second metadata. The first service node can use this new information, i.e., the second metadata, to augment the first metadata. The NSH for the packet/frame can carry the second metadata, which augments the first metadata, as the packet/frame traverses to the subsequent service node(s) in the service path.

When a subsequent, second service node processes the NSH with the second metadata, the new information provided by the second metadata can affect how the second service node processes the packet or frame. For instance, the second service node may decide to deny the packet/frame because of the second metadata.

The context being shared among service nodes is improved as the metadata is augmented when the packet/frame travels over the service path. The service nodes can optionally serve as a supplemental/additional "classifier" in the service path by classifying the packet/frame using their own capabilities. Through augmentation, a service node in the service path can contribute to the information being shared over the service function chain. The semantics (e.g., meaning, encoding scheme) can be conveyed in-line (in the service plane) or in the control plane.

Augmentation can be advantageous if the initial classifier does not have a particular classification functionality (or cannot conveniently or efficiently provide such functionality), or might not have information needed to know more about the packet. Common example is that the initial classifier is a hardware device that cannot look deep into the packet to get application information about the packet. The first service node, e.g., a firewall, a deep packet inspection engine, a load balancer, etc., may have greater classification capabilities. For instance, the initial classifier may provide first metadata which specifies the packet/frame as being associated with a guest (e.g., as opposed to an employee). A first service node, a deep packet inspection engine may find out that the packet/frame is associated with email (e.g., as opposed to streaming video content). The first service node can augment the first metadata by adding additional information, e.g., using second metadata which specifies the traffic is associated with email. A second service node, e.g., a firewall, can process the packet/frame based on the second metadata accordingly. For instance, the firewall can apply a policy based on the second metadata, wherein the policy may decide to block email traffic of guests. As the packet/frame traverses over the service path over onto other service nodes, more augmentation can occur. The semantics of the second metadata of the network service header can be shared via a control plane of the first service node and the second service node.

Within the context of the application, "metadata" refers to one or more pieces of information (e.g., bits of data, encoded values) in a context header section of a network service header. Metadata can refer to contents of the entire context header section, which can include the contents of one or more context header fields describing various attributes of the packet/frame. Metadata can also refer to contents of one individual context header field or a subset of context header fields in the context header section.

Moreover, the terms "first service node" and "second service node" does not necessarily imply that the "first service node" and the "second service node" are the first and second service nodes at the beginning of the service path that the packet/frame reaches as the packet/frame traverses over the service path. For instance, the first service node can be any suitable one of the service nodes among many service nodes in the service path (e.g., third one the packet/frame reaches as it traverses the service path, fourth one, fifth one, etc.). The second service node can be any suitable one of the service node(s) subsequent to the first service node downstream in the service path.

What is claimed is:

1. A method comprising:
   at a control plane element:
      augmenting a first control packet with a first interface identifier to form a first augmented control packet, the first interface identifier identifying a first interface at a physical network forwarding element; and
      transmitting the first augmented control packet having the first interface identifier via a tunnel to the physical network forwarding element; and
   at the physical network forwarding element:
      identifying the first interface identifier from the first augmented control packet;
      removing the first interface identifier from the first augmented control packet to obtain the first control packet; and
      transmitting the first control packet through the first interface at the physical network forwarding element based on the first interface identifier; and
   at the control plane element:
      receiving a second augmented control packet from the physical network forwarding element of a physical network underlay;
      identifying a second interface identifier from metadata in the second augmented control packet, the second interface identifier identifying a control plane presenting interface at the control plane element
      removing metadata from the second augmented control packet to generate a second control packet;
      providing the second control packet to the control plane presenting interface so that the control plane presenting interface views the second control packet as being directly received by the control plane presenting interface at the control plane element; and
      initializing protocol handling of the second control packet at the control plane element.

2. The method of claim 1, wherein augmenting the first control packet comprises adding a network service header (NSH) to the first control packet, wherein the NSH comprises metadata that includes the first interface identifier.

3. The method of claim 1, wherein transmitting the first augmented control packet comprises transmitting the first augmented control packet through the control plane presenting interface at the control plane element.

4. The method of claim 1, wherein the control plane element is part of a virtual router.

5. The method of claim 1, wherein identifying the second interface identifier from the metadata in the second augmented control packet comprises identifying the second interface identifier from a network service header metadata.

6. The method of claim 1, wherein the second interface identifier maps a user interface at the physical network forwarding element to the control plane presenting interface at the control plane element.

7. The method of claim 1, wherein identifying the second interface identifier comprises:
   triggering metadata extraction from a service path identifier or a service index in metadata in a network service header of the second augmented control packet;
   identifying the second interface identifier from a metadata table; and
   correlating the second interface identifier to the control plane presenting interface at the control plane element.

8. A computer-readable non-transitory medium comprising instructions for transmitting one or more control packets between a control plane and a physical network forwarding element, that when executed on one or more processors configure the one or more processors to:
   at a control plane element at the control plane:
      augment a first control packet with a first interface identifier to form a first augmented control packet, the first interface identifier identifying a first interface at the physical network forwarding element; and
      transmit the first augmented control packet having the first interface identifier via a tunnel to the physical network forwarding element; and
   at the physical network forwarding element:
      identify the first interface identifier from the first augmented control packet;
      remove the first interface identifier from the first augmented control packet to obtain the first control packet; and
      transmit the first control packet through the first interface at the physical network forwarding element based on the first interface identifier; and
   at the control plane element:
      receive a second augmented control packet from the physical network forwarding element of a physical network underlay;
      identify a second interface identifier from metadata in the second augmented control packet, the second interface identifier identifying a control plane presenting interface at the control plane element;
      remove metadata from the second augmented control packet to generate a second control packet;
      provide the second control packet to the control plane presenting interface so that the control plane presenting interface views the second control packet as being directly received by the control plane presenting interface at the control plane element; and
      initialize protocol handling of the second control packet at the control plane element.

9. The computer-readable non-transitory medium of claim 8, wherein the instructions configure the one or more processors to augment the first control packet by adding a network service header (NSH) to the first control packet, wherein the NSH comprises metadata that includes the first interface identifier.

10. The computer-readable non-transitory medium of claim 8, wherein the instructions configure the one or more processors to transmit the first augmented control packet through the control plane presenting interface at the control plane element.

11. The computer-readable non-transitory medium of claim 8, wherein the control plane element is part of a virtual router.

12. The computer-readable non-transitory medium of claim 8, wherein the instructions configure the one or more processors to identify the second interface identifier from a network service header metadata.

13. The computer-readable non-transitory medium of claim 8, wherein the second interface identifier maps a user interface at the physical network forwarding element to the control plane presenting interface at the control plane element.

14. The computer-readable non-transitory medium of claim 8, wherein the instructions configure the one or more processors to:

trigger metadata extraction from a service path identifier or a service index in metadata in a network service header of the second augmented control packet;

identify the second interface identifier from a metadata table; and correlate the second interface identifier to the control plane presenting interface at the control plane element.

15. An apparatus comprising:

a processor; and a memory configured to store instructions executable by the processor, wherein the processor is configured to execute the instructions to:

at a control plane element:

augment a first control packet with a first interface identifier to form a first augmented control packet, the first interface identifier identifying a first interface at a physical network forwarding element; and transmit the first augmented control packet having the first interface identifier via a tunnel to the physical network forwarding element; and at the physical network forwarding element:

identify the first interface identifier from the first augmented control packet;

remove the first interface identifier from the first augmented control packet to obtain the first control packet; and transmit the first control packet through the first interface at the physical network forwarding element based on the first interface identifier; and at the control plane element:

receive a second augmented control packet from the physical network forwarding element of a physical network underlay;

identify a second interface identifier from metadata in the second augmented control packet, the second interface identifier identifying a control plane presenting interface at the control plane element;

remove metadata from the second augmented control packet to generate a second control packet;

provide the second control packet to the control plane presenting interface so that the control plane presenting interface views the second control packet as being directly received by the control plane presenting interface at the control plane element; and initialize protocol handling of the second control packet at the control plane element.

16. The apparatus of claim 15, wherein the processor is further configured to augment the first control packet by adding a network service header (NSH) to the first control packet, wherein the NSH comprises metadata that includes the first interface identifier.

17. The apparatus of claim 15, wherein the processor is further configured to transmit the first augmented control packet through the control plane presenting interface at the control plane element.

18. The apparatus of claim 15, wherein the control plane element is part of a virtual router.

19. The apparatus of claim 15, wherein the processor is further configured to identify the second interface identifier from a network service header metadata.

20. The apparatus of claim 15, wherein the second interface identifier maps a user interface at the physical network forwarding element to the control plane presenting interface at the control plane element.

\* \* \* \* \*